United States Patent
Lih et al.

(10) Patent No.: US 9,529,774 B2
(45) Date of Patent: Dec. 27, 2016

(54) NETWORK TOPOLOGY OF HIERARCHICAL RING WITH GRAY CODING SHORTCUTS

(71) Applicant: Futurewei Technologies, Inc., Plano, TX (US)

(72) Inventors: Iulin Lih, San Jose, CA (US); William Lynch, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 147 days.

(21) Appl. No.: 14/528,979

(22) Filed: Oct. 30, 2014

(65) Prior Publication Data

US 2015/0117223 A1 Apr. 30, 2015

Related U.S. Application Data

(60) Provisional application No. 61/897,310, filed on Oct. 30, 2013.

(51) Int. Cl.
*H04J 14/00* (2006.01)
*G06F 15/173* (2006.01)
(Continued)

(52) U.S. Cl.
CPC ..... *G06F 15/17362* (2013.01); *G06F 15/7825* (2013.01); *H04L 12/437* (2013.01);
(Continued)

(58) Field of Classification Search
CPC .................................. H04L 41/12; H04J 14/00
(Continued)

(56) References Cited

U.S. PATENT DOCUMENTS 8,711,803 B1 * 4/2014 Wang .................. H04W 36/023
370/206
9,065,582 B2 * 6/2015 Barry ...................... H04J 14/00
(Continued)

OTHER PUBLICATIONS

Kitani, T., et al., "A configuration method for structured P2P overlay network considering delay variations," International Conference on Network-Based Information Systems, Aug. 19, 2009, pp. 547-552.
Wang, J., et al., "A Survey and Comparison of Multi-Ring Techniques for Scalable Battlespace Group Communications," Proceedings of SPIE, vol. 5820, May 26, 2005, 12 pages.
Foreign Communication from a Counterpart Application, PCT Application No. PCT/US2014/063234, International Search Report dated Jan. 30, 2015, 4 pages.

(Continued)

*Primary Examiner* — Wei Zhao
(74) *Attorney, Agent, or Firm* — Futurewei Technologies, Inc.

(57) ABSTRACT

An interconnection network comprising a plurality of nodes arranged in a ring topology, wherein the nodes comprise a first node and a second node, and wherein the first node is not adjacent to the second node, a plurality of base links coupled to the nodes and configured to interconnect adjacent nodes to provide point-to-point communications between the adjacent nodes, and a first shortcut coupled to the first node and the second node, wherein the first shortcut is configured to provide a point-to-point communication between the first node and the second node, wherein the first node and the second node comprise gray code encoded addresses that are differed by 1-bit at a particular bit position, and wherein the gray code encoded addresses are node addresses of the first node and the second node encoded by a gray code algorithm that provides a 1-bit difference between successive integer values in a binary format.

20 Claims, 10 Drawing Sheets

(51) Int. Cl.
*H04L 12/721* (2013.01)
*H04L 12/437* (2006.01)
*G06F 15/78* (2006.01)

(52) U.S. Cl.
CPC .......... *H04L 45/06* (2013.01); *Y02B 60/1207* (2013.01); *Y02B 60/1225* (2013.01)

(58) Field of Classification Search
USPC ........................................................ 370/238
See application file for complete search history.

(56) References Cited

U.S. PATENT DOCUMENTS

| | | | |
|---|---|---|---|
| 2004/0258177 A1* | 12/2004 | Shen | H03M 13/1117 375/308 |
| 2008/0276091 A1* | 11/2008 | Welin | H04L 67/104 713/170 |
| 2011/0206053 A1 | 8/2011 | Henry et al. | |
| 2014/0078927 A1 | 3/2014 | Thubert et al. | |

OTHER PUBLICATIONS

Foreign Communication from a Counterpart Application, PCT Application No. PCT/US2014/063234, Written Opinion dated Jan. 30, 2015, 7 pages.

* cited by examiner

NETWORK TOPOLOGY OF HIERARCHICAL RING WITH GRAY CODING SHORTCUTS

CROSS-REFERENCE TO RELATED APPLICATIONS

The present application claims priority to U.S. Provisional Patent Application 61/897,310, filed Oct. 30, 2013 by Iulin Lih, et. al., and entitled "Network Topology of Hierarchical Ring with Gray Coding Shortcuts", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An interconnection network refers to any system that enables data communication among its components, or nodes. An interconnection network may be any switch, router, processor-memory, input/output (I/O), system on a chip (SoC), network on a chip (NoC), multiple-chip processor cluster, multi-rack, multi-chassis, or other network. An SoC refers to a system that integrates all the functionality of a computer or other complex electronic data system onto a single integrated circuit or chip.

Network topology refers to the arrangement of the nodes in an interconnection or other network. Topology design may affect network performance, cost, power consumption, scalability, migration, and flexibility. Some examples of network performance metrics are network latency and network bandwidth. Network bandwidth refers to the maximum rate or throughput at which information is delivered in a network. Network latency refers to the delay between the sender of a packet and the receiver that receives the packet. Network performance depends on several factors, such as the physical topology of a network and/or the routing algorithm employed for selecting forwarding paths in the network. Consequently, topology design involves weighing many factors and is an important aspect of network implementation.

SUMMARY

In one embodiment, the disclosure includes an interconnection network comprising a plurality of nodes arranged in a ring topology, wherein the nodes comprise a first node and a second node, and wherein the first node is not adjacent to the second node, a plurality of base links coupled to the nodes and configured to interconnect adjacent nodes to provide point-to-point communications between the adjacent nodes, and a first shortcut coupled to the first node and the second node, wherein the first shortcut is configured to provide a point-to-point communication between the first node and the second node, wherein the first node and the second node comprise gray code encoded addresses that are differed by 1-bit at a particular bit position, and wherein the gray code encoded addresses are node addresses of the first node and the second node encoded by a gray code algorithm that provides a 1-bit difference between successive integer values in a binary format.

In another embodiment, the disclosure includes a network node comprising a first interconnect port configured to transfer data between the network node and a first node adjacent to the network node on a base ring in a hierarchical ring interconnection network, a second interconnect port configured to transfer data between the network node and a second node adjacent to the network node on the base ring, a third interconnect port configured to transfer data between the network node and a third node non-adjacent to the network node on a shortcut ring, wherein the third node is a next node on the base ring that comprises a gray code encoded address that switches a $k^{th}$ bit of a gray code encoded address of the network node, wherein k is a positive integer, wherein the third node's gray code encoded address is a node address of the third node encoded by a gray code algorithm that provides a 1-bit difference between successive integer values in a binary format, and wherein the network node's gray code encoded address is a node address of the network node encoded by the gray code algorithm, a memory coupled to the first interconnect port, the second interconnect port, and the third interconnect port, wherein the memory is configured to store a shortest path routing table, and a processing unit coupled to the first interconnect port, the second interconnect port, the third interconnect port, and the memory, wherein the processing unit is configured to direct data transfer between the first interconnect port, the second interconnect port, and the third interconnect port according to the shortest path routing table.

In yet another embodiment, the disclosure includes a method comprising receiving a data packet at a first of a plurality of nodes on a base ring in a hierarchical ring interconnection network, wherein the nodes are arranged in an order of increasing node addresses, and wherein each node is directly connected to two adjacent nodes via a base link, and sending the data packet to a second of the nodes non-adjacent to the first node via a shortcut that directly connects the first node to the second node, wherein the shortcut provides a shortest path in the network for the data packet to reach a destination node of the data packet, wherein the second node is a nearest non-adjacent node in the base ring that comprises a gray code encoded address that switches a $k^{th}$ bit of a gray code encoded address of the first node, wherein the gray code encoded address of the second node is a node address of the second node encoded by a gray code algorithm that provides a 1-bit difference between successive integer values in a binary format, and wherein k is a positive integer.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Figure 1:
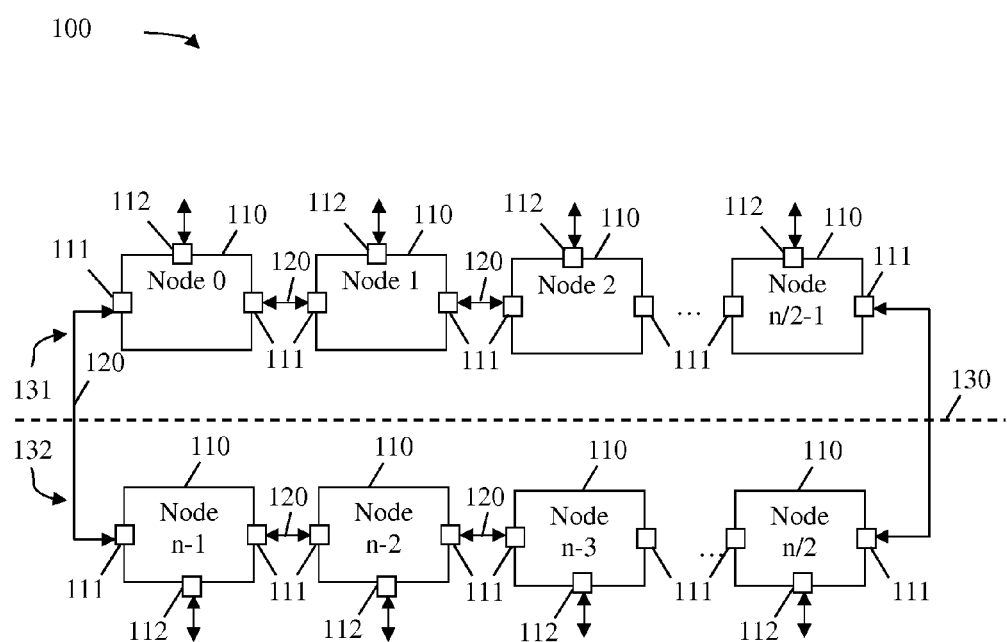
FIG. 1 is a schematic diagram of an embodiment of a network with a ring topology.

FIG. 1 is a schematic diagram of an embodiment of a network 100 with a ring topology. The network 100 is referred to as a ring network. The network 100 comprises a plurality of nodes 110 interconnected by a plurality of links 120. The term link is used interchangeably with the term connection and refers to any physical or logical connection for transferring data. The links 120 are bi-directional links that transfer data in opposite directions. The nodes 110 are any nodes that send and/or receive data in the network 100. For example, in a communication network, the nodes 110 may be routers, switches, and/or bridges, and the links 120 may be cables and/or optic fibers. In an SoC and/or NoC, the nodes 110 may be processing cores, memory blocks, timing sources, and/or peripherals, and the links 120 may be switching fabric wires. In a printed circuit board, the nodes 110 may be any devices and/or components, and the links 120 may be wires. In a data center, the nodes 110 may be network equipment, such as servers, and the links 120 may be backplane cables.

Each node 110 comprises two interconnect ports 111 and an inject/eject (I/E) port 112, which all are bi-directional physical ports. In the network 100, each node 110 is interconnected to two adjacent nodes 110 via the two interconnect ports 111 to form the ring topology. Each node 110 may act as a data source and/or a data sink. For example, when a node 110 is a data source, data is injected into the network 100 via the I/E port 112. Alternatively, when a node 110 is a data sink, data is ejected from the network 100 via the I/E port 112. As such, when data arrives at a node 110, the data may be transferred to a next node 110 and stay in the network 100 or exit the network 100 via the I/E port 112. The ring topology shown in the network 100 is simple and may support any number of nodes 110. However, the network 100 comprises a low bandwidth and a high latency.

In the network 100, any node 110 may be a source node or a destination node and data may be transferred between a source node and a destination node in a single transfer direction, for example, a clockwise direction or a counter-clockwise direction. When transferring data between non-adjacent nodes 110, the data may traverse through multiple intermediary nodes 110 and links 120. The number of intermediary nodes 110 through which data traverses between a source and a destination is referred to as the hop count. As shown in the network 100, the number of nodes 110 is n and the maximum number of hops is about $$\frac{n}{2}$$

based on the clockwise transfer and the counter-clockwise transfer. Thus, the average number of hops is about $$\frac{n}{4}.$$

The maximum number of hops and the average number of hops provide a latency measure for the network 100.

The line 130 represents a bisectional cut that divides the network 100 into two equal portions 131 and 132, each comprising the same number of nodes 110. The bisectional bandwidth refers to the total sum of bandwidth in each portion 131 or 132. The bisectional bandwidth is a measure for determining network performance. For example, each node 110 injects data into the network 100 at an injection rate of I and each link 120 supports a bandwidth of J. Then, the required bisectional bandwidth is about $$\frac{n \times I}{2}$$

and the supported bisectional bandwidth is about $4 \times J$. Thus, the values n, I, and J are restricted to $n \times I \leq 8 \times J$. The following table summarizes the network performance parameters for the network 100.

TABLE 1

| Network Performance for the Network 100 | |
| --- | --- |
| Maximum number of hops | $\frac{n}{2}$ |
| Average number of hops | $\frac{n}{4}$ |
| Required bisectional bandwidth | $\frac{n \times I}{2}$ |
| Supported bisectional bandwidth | $4 \times J$ |

Figure 2:
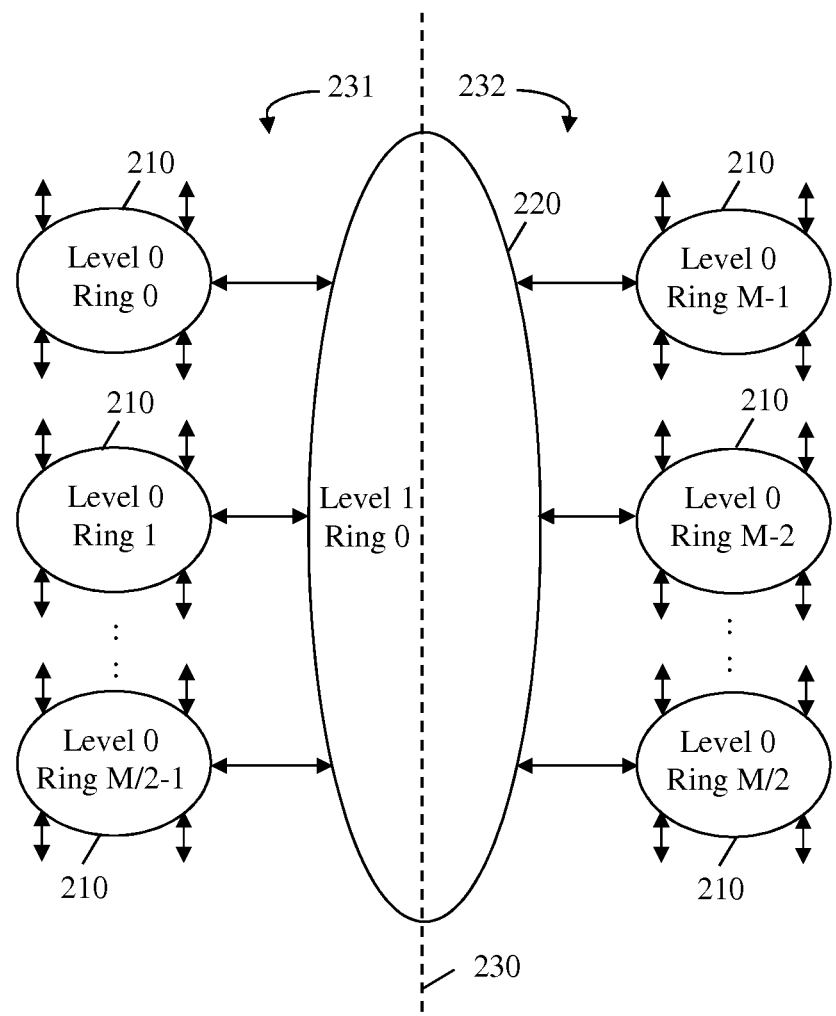
FIG. 2 is a schematic diagram of an embodiment of a network with a hierarchical ring topology.

FIG. 2 is a schematic diagram of an embodiment of a network 200 with a hierarchical ring topology. The network 200 is referred to as a hierarchical ring network. The network 200 comprises a plurality of level 0 ring networks 210 interconnected by a level 1 ring network 220. The level 1 ring network 220 is referred to as the base ring or the global ring. Each level 0 ring network 210 and the level 1 ring network 220 comprises similar structures as in the network 100. For example, each level 0 ring network 210 and each level 1 ring network 220 comprises a plurality of nodes, similar to the nodes 110, interconnected by links, similar to the links 120, to form a ring network. However, the network 200 divides a total n number of nodes into N×M nodes, where n=N×M, and N nodes form a level 0 ring network 210. Thus, the network 200 comprises M level 0 ring networks 210, each comprising N nodes. The level 1 ring network 220 connects the M level 0 ring networks 210 to enable data transfer between any level 0 ring networks 210. The level 1 ring network 220 operates similar to a ring network with M nodes.

Similar to the line 130 in the network 100, the line 230 represents a bisectional cut that divides the network 200 into two equal portions 231 and 232, each comprising the same number of nodes. In the network 200, the maximum number of hops is about $$\frac{N}{2}$$

in each level 0 ring network 210 and the maximum number of hops is about $$\frac{M}{2}$$

in the level 1 ring network 220. To transfer data from any node in a level 0 ring network 210 to any node in another level 0 ring network 210, the maximum number of hops is about $$N + \frac{M}{2}.$$

Thus, the average number of hops is about $$\frac{N}{2} + \frac{M}{4}.$$

Similar to the network 100, each N node in the level 0 ring network 210 or each M node in the level 1 ring network 220 injects data in to the network 200 at an injection rate of I and each link supports a bandwidth of J. Thus, the required bisectional bandwidth is about $$\frac{N \times M \times I}{2}$$

and the supported bisectional bandwidth is about J×4. The following table summarizes the network performance parameters for the network 200.

TABLE 2

Network Performance for the Network 200

| | |
|---|---|
| Maximum number of hops | $N + \frac{M}{2}$ |
| Average number of hops | $\frac{N}{2} + \frac{M}{4}$ |
| Required bisectional bandwidth | $\frac{N \times M \times I}{2}$ |
| Supported bisectional bandwidth | $J \times 4$ |

By comparing table 1 and table 2, the latency is linearly improved in the network 200 with the hierarchical ring topology. However, the supported bisectional bandwidth remains the same as the network 100 with the single ring topology. It should be noted that although the network 200 illustrates the hierarchical ring network as a two level ring network, the network 200 may be expanded into a K level hierarchical ring network, where a plurality of $k^{th}$ level rings are connected by a $(k+1)^{th}$ level ring and the network performance for a K level hierarchical ring network comprises a similar trend as the two level ring network.

Figure 3:
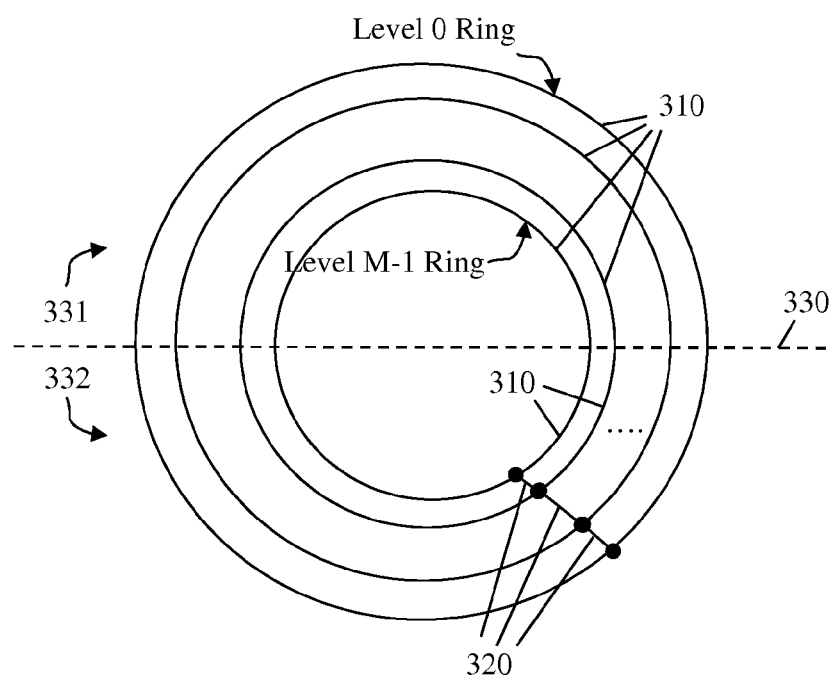
FIG. 3 is a schematic diagram of an embodiment of a network with a parallel ring topology.

FIG. 3 is a schematic diagram of an embodiment of a network 300 with a parallel ring topology. The network 300 is referred to as a parallel ring network. The network 300 comprises a plurality of ring networks 310 arranged in a concentric-circle configuration. Each ring network 310 comprises a similar structure as in the network 100. For example, each ring network 310 comprises a plurality of nodes, similar to the nodes 110, interconnected by links, similar to the links 120, to form a ring network. However, the network 300 divides a total n number of nodes into N×M nodes, where n=N×M, and every N nodes form a ring network 310. Thus, the network 300 comprises M parallel ring networks 310, each comprising N nodes. For example, the ring network 310 in the innermost ring is referred to as the level M−1 ring and the outermost ring is referred to as the level 0 ring. The networks 310 may be interconnected by links 320, similar to the links 120, to enable data transfer between the networks 310.

Similar to the line 130 in the network 100, the line 330 represents a bisectional cut that divides the network 300 into two equal portions 331 and 332, each comprising the same number of nodes. In the network 300, any of the N×M nodes may be a source, but each node may be the destination of one of the M ring networks 310. Thus, the maximum number of hops is about $$\frac{N}{2}$$

and the average number of hops is about $$\frac{N}{4}.$$

Similar to the network 100, each node injects data into the network 300 at an injection rate of I and each link supports a bandwidth of J. Then, the required bisectional bandwidth is about $$\frac{N \times M \times I}{2}$$

and the supported bisectional bandwidth is about M×J×4. The following table summarizes the network performance parameters for the network 300.

TABLE 3

Network Performance for the Network 300

| | |
|---|---|
| Maximum number of hops | $\frac{N}{2}$ |

TABLE 3-continued

Network Performance for the Network 300

| | |
|---|---|
| Average number of hops | $\dfrac{N}{4}$ |
| Required bisectional bandwidth | $\dfrac{N \times M \times I}{2}$ |
| Supported bisectional bandwidth | $M \times 4 \times J$ |

By comparing table 1 and table 3, both the latency and the bandwidth are linearly improved in the network 300 with the parallel ring topology. Other embodiments may employ higher parallelism, such as mesh and torus ring, to further improve ring network performance, but at the expense of higher complexity and/or cost.

Disclosed herein are embodiments of hierarchical ring network topologies that focus on improving network performance, such as latency and bandwidth, with a minimal increase in topology complexity. The disclosed embodiments employ a hierarchical ring structure that comprises a base ring with additional shortcuts determined based on a gray code addressing scheme. The base ring comprises a plurality of nodes arranged in a ring topology and interconnected by a plurality of physical links to form a base ring, where each node is directly connected to two adjacent nodes. The shortcuts are additional physical links that connect one or more subsets of the nodes in the base ring and are parallel to the links in the base ring. The nodes are selected for shortcut connections based on the gray code encoded addresses of the nodes to provide an efficient address switching implementation. For example, for a base ring network comprising N nodes, a shortcut may be added for about every 2, 4, 8, and/or up to N/2 nodes. However, the number of interconnect ports per node is fixed, for example, at about 4, to enable a uniform structure for all nodes. By adding the shortcuts, the latency and the bandwidth scale logarithmically instead of linearly as in some hierarchical ring and/or parallel ring networks. Thus, the disclosed hierarchical ring network topologies provide low latency and high bandwidth. In addition, the disclosed embodiments employ statically generated routing tables to provide simple routing and further incorporate VCs for routing to avoid deadlocks. Deadlocks refer to the occurrences of multiple nodes waiting on the same resource, such as buffers.

Figure 4:
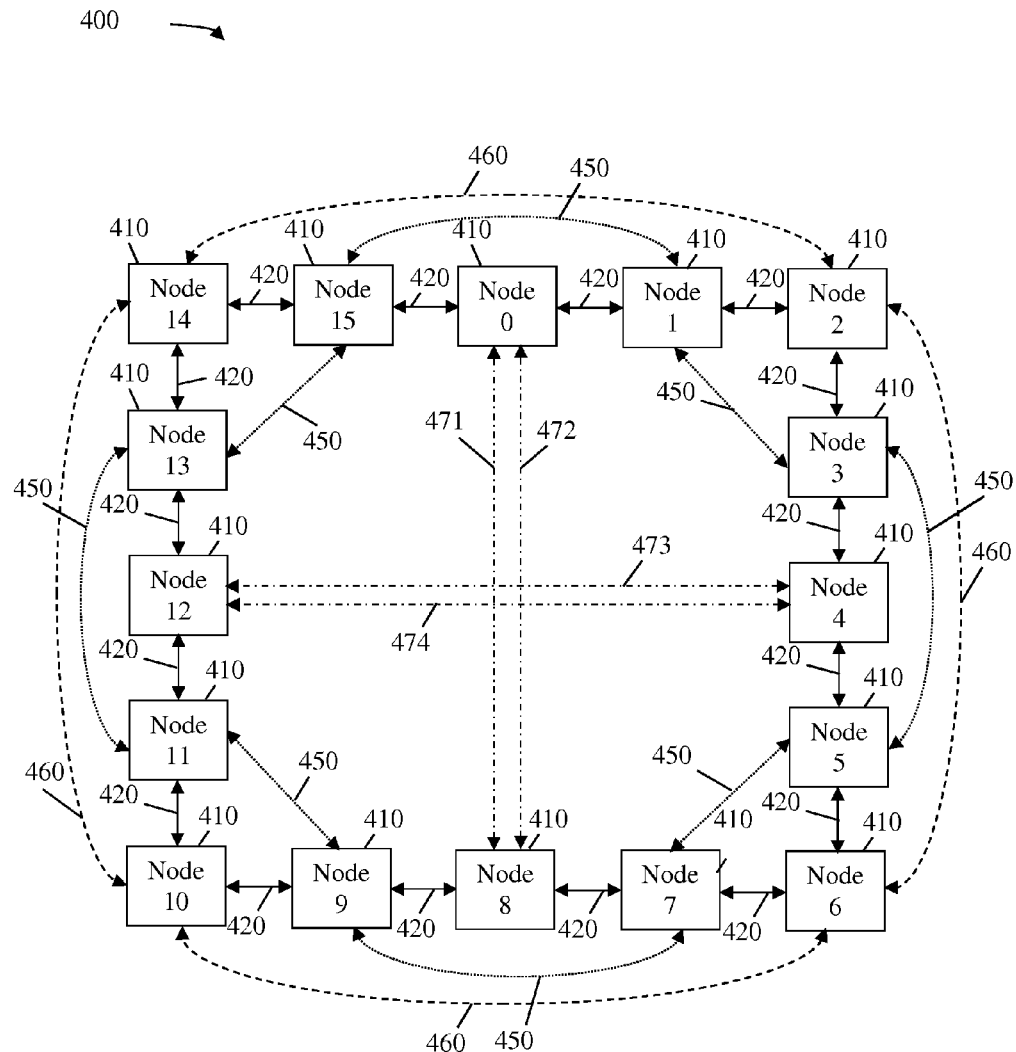
FIG. 4 is a schematic diagram of an embodiment of a network with a hierarchical ring topology and gray coding shortcuts.

FIG. 4 is a schematic diagram of an embodiment of a network 400 with a hierarchical ring topology and gray coding shortcuts. The network 400 comprises a plurality of nodes 410 interconnected by a plurality of base links 420 (shown as solid lines) to form a base ring. The nodes 410, the base links 420, and the base ring are similar to the nodes 110, the links 120, and the network 100. The base links 420 are referred to as the level 0 links, the nodes 410 are referred to as the level 0 nodes, and the base ring is referred to as the level 0 ring. The network 400 further comprises a plurality of level 1 shortcuts 450 (shown as dotted lines), a plurality of level 2 shortcuts 460 (shown as dashed lines), and a plurality of level 3 shortcuts 471, 472, 473, and 474 (shown as dot-dashed lines). The level 1 shortcuts 450, the level 2 shortcuts 460, and the level 3 shortcuts 471-474 are physical connections similar to the base links 420. The nodes 410 connected by the level 1 shortcuts 450 are also referred to as the level 1 nodes. The nodes 410 connected by the level 2 shortcuts 460 are also referred to as the level 2 nodes. The nodes 410 connected by the level 3 shortcuts 471-474 are also referred to as the level 3 nodes. As shown, the level 1 nodes are separated by one node 410, the level 2 nodes are separated by three nodes 410, and the level 3 nodes are separated by seven nodes 410. When a network 400 comprises k levels, the level k nodes are separated by $2^k-1$ nodes. The level 1 nodes interconnected by the level 1 shortcuts 450 form a level 1 ring. The level 2 nodes interconnected by the level 2 shortcuts 460 form a level 2 ring. The level 3 nodes interconnected by the level 3 shortcuts 471 and 472 form a level 3 ring. The level 3 nodes interconnected by the level 3 shortcuts 473 and 474 form another level 3 ring. The level 1 ring, the level 2 ring, and the level 3 rings are referred to as the shortcut rings.

The placements of the level 1 shortcuts 450, level 2 shortcuts 460, and the level 3 shortcuts 471-474 and the selection of the level 1 nodes, level 2 nodes, and level 3 nodes are determined based on a gray code algorithm. A gray code is a binary number system where two successive values differ by only one bit in a binary format. A gray code shortcut is a shortcut between nodes with addresses that differ by a bit from a previous address at a particular bit position associated with a level of the gray code shortcut. A gray code shortcut ring is a ring made up of grade code shortcuts each associated with a common level (e.g. bit position). A gray code algorithm is an algorithm for assigning gray code shortcuts. Thus, the level 1 shortcuts 450, the level 2 shortcuts 460, and the level 3 shortcuts 471-474 are referred to as the gray coding shortcuts. For example, the nodes 410 are assigned with consecutive integer addresses in the order of the nodes' 410 positions (e.g., in a clockwise direction or a counter-clockwise direction) in the base ring. Thus, the nodes are arranged in an order of increasing addresses in one direction or an order of decreasing addresses in an opposite direction. The addresses of the nodes 410 are converted into gray codes. To convert a node 410's address into a gray code, the node 410's address is first represented in a binary format, for example, b[n:0], where b[0] represents the least significant bit (LSB) and b[n] represents the most significant bit (MSB). The binary node address b[n:0] may be converted to a gray code encoded address b'[n:0] according to the gray code algorithm. One approach to implementing the gray code encoded address is by right-shifting the binary address b[n:0] by 1-bit and applying an exclusive OR operation on the right-shifted binary address and the original binary address as shown below:

$$b'=(b>>1)\oplus b, \qquad (1)$$

where >> is a right bit shift operator and $\oplus$ is an exclusive OR operator.

As shown in FIG. 4, the number of nodes 410 in the network 400 is sixteen and the addresses range from 0 to 15. The gray code encoded addresses for the sixteen nodes 410 are shown in Table 4 below.

TABLE 4

Gray Code Encoded Node Addresses

| Node Addresses | Gray Code Encoded Node Addresses b'[3:2:1:0] |
|---|---|
| 0 | 0000 |
| 1 | 0001 |
| 2 | 0011 |
| 3 | 0010 |
| 4 | 0110 |
| 5 | 0111 |

TABLE 4-continued

Gray Code Encoded Node Addresses

| Node Addresses | Gray Code Encoded Node Addresses b'[3:2:1:0] |
|---|---|
| 6 | 0101 |
| 7 | 0100 |
| 8 | 1100 |
| 9 | 1101 |
| 10 | 1111 |
| 11 | 1110 |
| 12 | 1010 |
| 13 | 1011 |
| 14 | 1001 |
| 15 | 1000 |

In the gray code algorithm, the nodes for a particular level are selected such that adjacent nodes in the particular level comprise gray code encoded addresses that are differed by one at a particular bit position. For example, the level 1 nodes are selected based on a 1-bit switch at bit position 0 of the gray code encoded addresses, which leads to the nodes 410 with node addresses 1, 3, 5, 7, 9, 11, 13, and 15 to be selected for the level 1 shortcut ring. The bit position 0 (e.g., b' [0]) refers to the right most bit or the first LSB of the gray code encoded addresses. The level 2 nodes are selected based on a 1-bit switch at bit position 1 (e.g., b' [1]) of the gray code encoded node addresses, which leads to the nodes 410 with node addresses 2, 6, 10, and 14 to be selected for the level 2 shortcut ring. The level 3 nodes are selected based on a 1-bit switch at bit position 2 (e.g., b' [2]) of the gray code encoded node addresses, which leads to the nodes 410 with node addresses 4 and 12 to be selected for the level 3 shortcut ring. By observing the gray code encoded addresses shown in Table 4, an additional level 3 shortcut ring may be formed by selecting another set of level 3 nodes based on a 1-bit switch at bit position 3 (e.g., b' [3]) of the gray code encoded addresses, which leads to the nodes 410 with node addresses 0 and 7 to be selected for a second level 3 shortcut ring. Such a gray code addressing scheme enables data transfer to be achieved with a 1-bit address switch when the data transfer is over one of the shortcuts 450, 460, and 471-474. Since switching activities contribute to a significant portion of total power consumption, the reduction in switching activities may lead to a better power efficiency.

The gray code shortcut placement scheme described above may be applied to a network, such as the network 400, with any number of nodes, such as the nodes 410. For example, for a network with n nodes in a base ring, where n is a positive integer that is a power of 2, the maximum number of shortcut levels is $Log_2(n)-1$. To identify a set of level k nodes for level k shortcut connections, the node addresses are converted into gray codes and the nodes with a 1-bit switch at the $k^{th}$ LSB (e.g., corresponding to bit position k-1) of the gray code encoded addresses are selected, where $1 \leq k \leq Log_2(n)-1$. For example, a first node is selected from the n nodes to be a level k node. To select a subsequent level k node, the gray code encoded addresses of the nodes subsequent to the first node (e.g., in a clockwise direction) in the base ring are compared to the first node's gray code encoded address. When a node comprises a gray code encoded address that toggles the $k^{th}$ LSB of the first node's gray code encoded address is found, the node is selected as the subsequent level k node. To identify a second shortcut ring for the last level, the nodes are selected based on a 1-bit switch at the $Log_2(n)^{th}$ LSB of the gray code encoded addresses. It should be noted that the nodes are selected such that each shortcut ring comprises a different set of the n nodes. By restricting the shortcut rings to each include a different set of the n nodes, each node may be configured with the same number of interconnect ports, such as the ports 411. For example, each node comprises four interconnect ports, where two of the interconnect ports are connected to a pair of base links, such as the base links 420, for transferring data in the base ring, and the other two interconnect ports are connected to a pair of shortcuts, such as the shortcuts 450, 460, or 471-474, for transferring data in a shortcut ring.

To further optimize data flow, the last level shortcuts are limited to transfer data in a particular half of the network. For example, in the network 400, the level 3 shortcut 471 transfers data in the left half (e.g., clockwise from node 8 to node 0 or counter-clockwise from node 0 to node 8) of the network 400. The level 3 shortcut 472 transfers data in the right half (e.g., clockwise from node 0 to node 8 or counter-clockwise from node 8 to node 0) of the network 400. The level 3 shortcut 473 transfers data in the upper half (e.g., clockwise from node 12 to node 4 or counter-clockwise from node 4 to node 12) of the network 400. The level 3 shortcut 474 transfers data in the bottom half (e.g., clockwise from node 4 to node 12 or counter-clockwise from node 12 to node 4) of the network 400.

In the network 400, any of the nodes 410 may be a source or a destination. However, data transfer is limited to be in a clockwise direction or a counter-clockwise direction, as discussed more fully below. Thus, the maximum number of hops is about $2 \times Log_2(n)$ and the average number of hops is about $Log_2(n)$, where n is the total number of nodes 410 in the network 400. Similar to the network 100, 200, and 300, each node 410 injects data into the network 400 at an injection rate of I and each link 420 supports a bandwidth of J. Then, the required bisectional bandwidth is about $$\frac{n \times I}{2}$$

and the supported bisectional bandwidth is about $Log_2(n) \times J \times 4$. The following table summarizes the network performance parameters for the network 400.

TABLE 5

| Network Performance for the Network 400 | |
|---|---|
| Maximum number of hops | $2 \times Log_2(n)$ |
| Average number of hops | $Log_2(n)$ |
| Required bisectional bandwidth | $\frac{n \times I}{2}$ |
| Supported bisectional bandwidth | $Log_2(n) \times J \times 4$ |

By comparing table 5 to tables 1, 2, and 3, both the latency and the bandwidth are improved in the network 400 and the improvements scale logarithmically instead of linearly with the number of nodes in the network.

Figure 5:
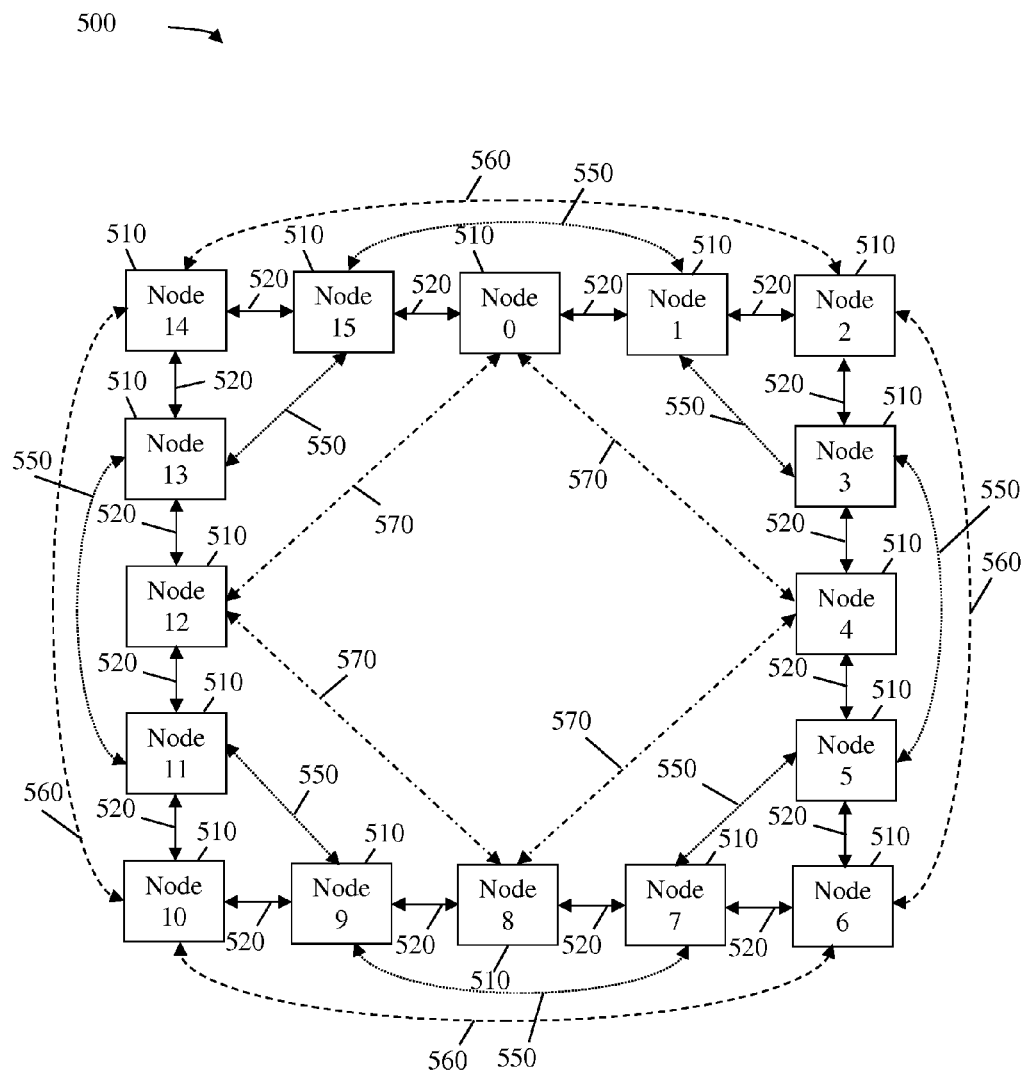
FIG. 5 is a schematic diagram of another embodiment of a network with a hierarchical ring topology and gray coding shortcuts.

FIG. 5 is a schematic diagram of another embodiment of a network 500 with a hierarchical ring topology and gray coding shortcuts. The network 500 is similar to the network 400, but comprises different shortcut placements. The network 500 comprises a plurality of nodes 510, similar to the nodes 410, interconnected by a plurality of base links 520, similar to the base links 420, to form a base ring. The network 500 further comprises a plurality of level 1 shortcuts 550 (shown as dotted lines), a plurality of level 2 shortcuts 560 (shown as dashed lines), and a plurality of level 3 shortcuts 570 (shown as dot-dashed lines). The level 1 shortcuts 550, the level 2 shortcuts 560, and the level 3 shortcuts 570 are physical connections similar to base links 110, 410, and 510. The placements of the level 1 shortcuts 550 and the level 2 shortcuts 560 are similar to the placements of the level shortcuts 450 and the level 2 shortcuts 460, respectively. However, the last level (e.g., level 3) shortcuts 570 are placed differently and the last level nodes are selected differently when compared to the network 400. For example, the network 500 comprises one shortcut ring in the last level instead of two shortcut rings as in the network 400 and the last level nodes are separated by $$\frac{N}{4} - 1$$

instead of $$\frac{N}{2} - 1$$

nodes as in the network 400. In the network 500, the level 3 shortcuts 570 connect the nodes 510 based on bit positions 2 and 3 (e.g., the $3^{rd}$ LSB and the $4^{th}$ LSB) of the gray code encoded addresses of the nodes 510, for example, either a 1-bit switch at bit position 2 or 3. Similar to the network 400, the level 1 nodes, level 2 nodes, and level 3 nodes are selected such that each shortcut ring includes a different set of the nodes 510 in order to limit the nodes 510 to comprise the same number of interconnect ports, such as the ports 111, for example, about 4.

To generate the shortcut placements for level k shortcuts in the network 500, the node addresses are converted into gray codes and the nodes with a 1-bit switch at the $k^{th}$ LSB (e.g., bit position k−1) of the gray code encoded addresses are selected, where 0≤k≤Log$_2$(n)−2 and n is the total number of nodes 510 in the network 500. For the last level shortcuts or the level Log$_2$(n)−1 shortcuts, the nodes are selected based on a 1-bit switch at the (Log$_2$(n)−1)$^{th}$ LSB while the Log$_2$(n)$^{th}$ LSB is unchanged or based on a 1-bit switch at the Log$_2$(n)$^{th}$ LSB while the (Log$_2$(n)−1)$^{th}$ LSB is unchanged. The network 500 may provide similar network performance as in network 400 shown in table 5.

Although the above embodiments describe the shortcut placements in a network with a total number of nodes that is a power of 2, the shortcut placement technique may be employed to configure a network with any number of nodes. For example, to generate a network with N number of nodes when N is not a power of 2, the base ring is generated by employing M number of nodes, where M is the next higher-power of 2. The shortcuts are placed by employing the gray code shortcut placement scheme described above. Subsequently, nodes and/or links are deleted to provide N number of nodes. If the performance allows, any shortcut except the base links in the base ring may be removed to degenerate the number of shortcuts.

Figure 6:
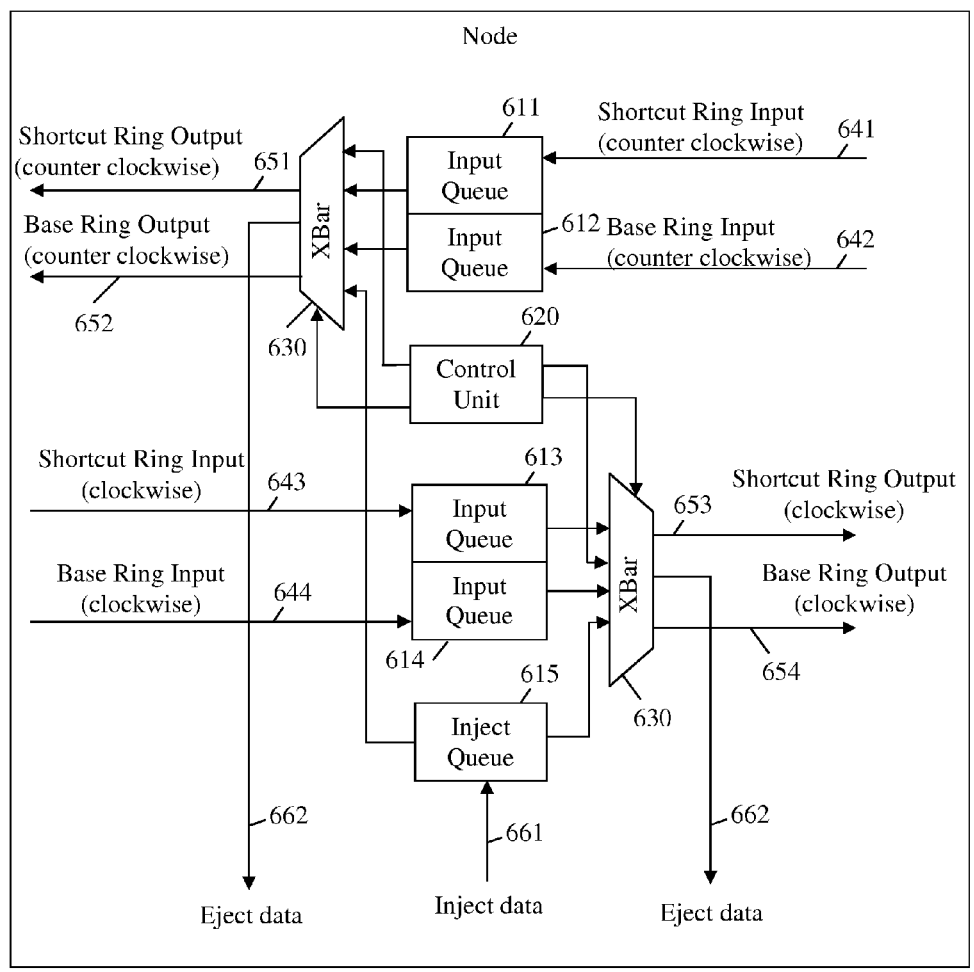
FIG. 6 is a schematic diagram of an embodiment of a logical structural view of a node.

FIG. 6 is a schematic diagram of an embodiment of a logical structural view of a node 600. The node 600 is employed in a hierarchical ring network, such as the network 400 and 500. The node 600 may act as any of the nodes 410 and 510. FIG. 6 illustrates the logical structure of the node 600 for performing data transfer and flow control. The node 600 comprises a plurality of queues 611, 612, 613, 614, and 615, a control unit 620, and a plurality of crossbar (XBar) switches 630. The queues 611-615 may be a single block of memory, such as random-access memory (RAM), partitioned into a plurality of portions, each corresponding to a queue 611-615. Alternatively, each queue 611-615 may be a separate memory block. The queues 611-614 are configured to interface with interconnect input/output (I/O) ports, such as the interconnect ports 111. During operation, each interconnect port receives data transferring in a clockwise direction and transmits data in a counterclockwise direction or receives data transferring in a counter-clockwise direction and transmits data in a clockwise direction. For example, the queue 611 is configured to buffer data received from a counter-clockwise shortcut ring input path 641, where the data is travelling in a clockwise direction in a shortcut ring. The shortcut ring may be a level 1 shortcut ring (e.g., formed by shortcuts the 450 or 550), a level 2 shortcut ring (e.g., formed by shortcuts 460 or 560), or a level 3 shortcut ring formed by the shortcuts 471-474 or 570. The queue 612 is configured to buffer data received from a counter-clockwise base ring input path 642, where the data is travelling in a counter-clockwise in the base ring (e.g., formed by base links 420 or 520). The queue 613 is configured to buffer data received from a clockwise shortcut ring input path 643 and the queue 614 is configured to buffer data received from a clockwise base ring input path 644. The queue 615 is configured to interface with an I/E port, such as the I/E port 112. For example, the queue 615 is configured to buffer data generated by the node 600 (e.g., injected via a data inject path 661) and destined for a node in the network.

The Xbar switches 630 are devices configured to connect multiple inputs to multiple outputs. For example, the Xbar switches 630 comprise cross-point matrices that provide a connection point between any pair of input and output. The control unit 620 comprises control logics configured to perform routing control, flow control, and/or other control functions to facilitate data transfer in and out of the node 600. A first of the Xbar switches 630 is coupled to the queues 611-612 and 615 and the control unit 620 for switching counter-clockwise data. A second of the Xbar switches 630 is coupled to the queues 613-614 and 615 and the control unit 620 for switching clockwise data. The control unit 620 performs routing to determine a forwarding path for the data buffered in the queues 611-615 and configures the XBar switches 630 to route the data to a port corresponding to the forwarding path, for example, pre-configured in a routing table. For example, the data buffered in the queues 611-614 may be sent to a shortcut ring or a base ring or eject from the network (e.g., via data eject paths 662) when the node 600 is the destination. As shown in FIG. 6, incoming data traveling in a counter clockwise direction is routed to an output path 651 towards a shortcut ring or an output path 652 towards the base ring in the counter clockwise direction, incoming data traveling in a clockwise direction is routed to an output path 653 towards a shortcut ring or an output path 654 towards the base ring in the clockwise direction, and data initiated by the node 600 may be route to any one of the output paths 651-654 according to the forwarding path selected by the control unit 620. The node 600 may implement the method 800 and/or 900, as discussed more fully below.

Figure 7:
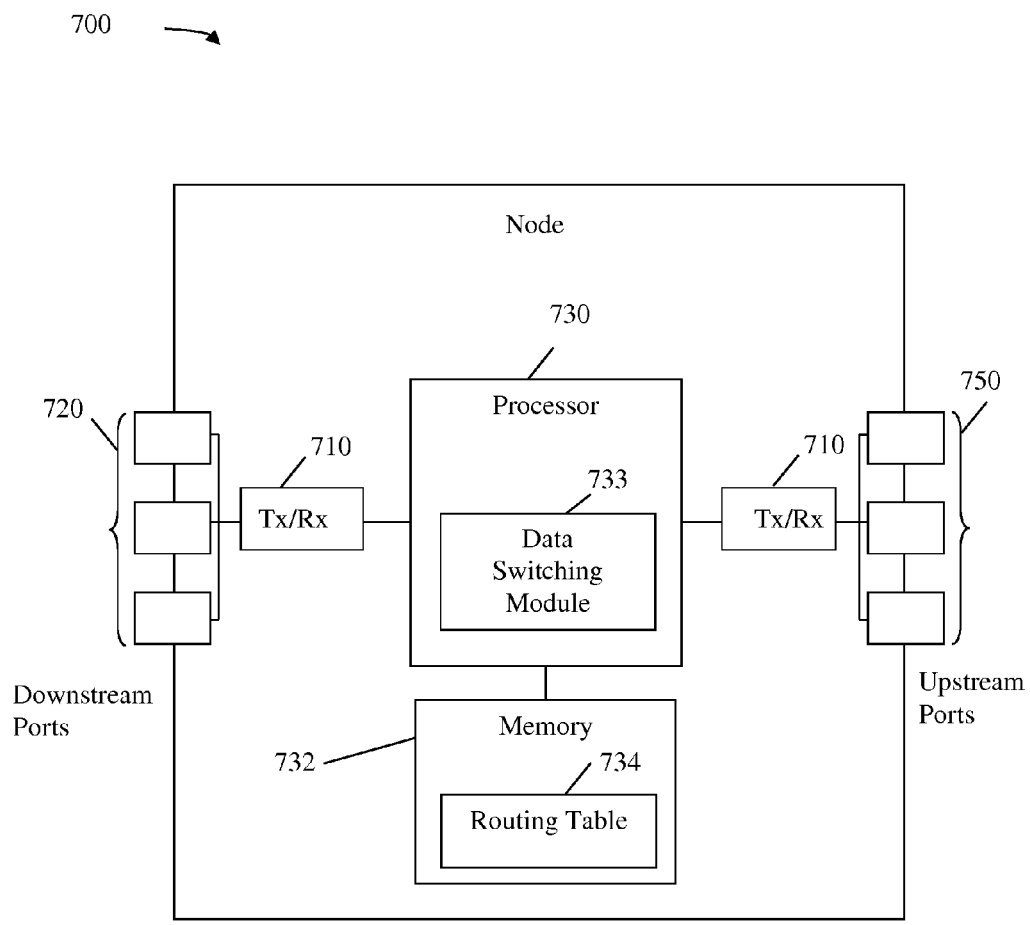
FIG. 7 is a schematic diagram of another embodiment of a node.

FIG. 7 is a schematic diagram of another embodiment of a node 700, which may act as a node in a hierarchical ring network, such as the network 400 and/or 500. For instance, the node 700 may be a router, a switch, and/or a bridge when the network is a communication network. When the network is an interconnection network on an SoC and/or NoC, the node 700 may be a processing core, a memory block, a timing source, and/or a peripheral. When the network is a data center, the node 700 may be network equipment, such as a server. The node 700 may be configured to implement and/or support the routing mechanisms described herein. The node 700 may be implemented in a single node or the functionality of node 700 may be implemented in a plurality of nodes. One skilled in the art will recognize that the term node encompasses a broad range of devices of which node 700 is merely an example. node 700 is included for purposes of clarity of discussion, but is in no way meant to limit the application of the present disclosure to a particular node embodiment or class of node embodiments. At least some of the features and/or methods described in the disclosure may be implemented in a network apparatus or module such as a node 700. For instance, the features and/or methods in the disclosure may be implemented using hardware, firmware, and/or software installed to run on hardware. As shown in FIG. 7, the node 700 may comprise transceivers (Tx/Rx) 710, which may be transmitters, receivers, or combinations thereof. A Tx/Rx 710 may be coupled to plurality of downstream ports 720 for transmitting and/or receiving frames from other nodes and a Tx/Rx 710 may be coupled to plurality of upstream ports 750 for transmitting and/or receiving frames from other nodes, respectively. A processor 730 may be coupled to the Tx/Rx 710 to process the frames and/or determine which nodes to send the frames to. The processor 730 may comprise one or more multi-core processors and/or memory devices 732, which may function as data stores, buffers, etc. Processor 730 may be implemented as a general processor or may be part of one or more application specific integrated circuits (ASICs) and/or digital signal processors (DSPs). Processor 730 may comprise a data switching module 733, which may perform data switching and/or flow control functions of a node 410 or 510 and implement methods 800, 900, and/or 1000, as discussed more fully below, and/or any other method discussed herein. In an alternative embodiment, the data switching module 733 may be implemented as instructions stored in the memory devices 732, which may be executed by the processor 730. The memory device 732 may comprise a cache for temporarily storing content, e.g., a RAM. Additionally, the memory device 732 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 732 may comprise a routing table 734, which may be generated by the method 800 and/or 900 and may be employed by the method 1000.

It is understood that by programming and/or loading executable instructions onto the node 700, at least one of the processor 730 and/or memory device 732 are changed, transforming the node 700 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The disclosed hierarchical ring networks, such as the networks 400 and 500, may employ static routing mechanisms to route data in the network. For example, each node, such as the nodes 410 and 510, in the network may be pre-configured with a static routing table. The static routing table may be generated offline and may comprise a next hop for every destination node in the network and a transfer direction in a clockwise direction or a counter-clockwise direction. For example, for a network with N nodes, the static routing table comprises N×(N−1) entries, where each entry stores a next hop node address and a transfer direction. To identify a forwarding path between a source-destination pair, a shortest path is selected from either a clockwise transfer direction or a counter-clockwise transfer direction such that data is transferred in a single direction from the source to the destination. The shortest path refers to the path with the minimum number of hops. The shortest path may include base links, such as the base links 420 or 520, and/or shortcuts, such as the shortcuts 450, 460, 471-474, 550, 560, and/or 570. After identifying the shortest path, the node in a next hop and the transfer direction is stored in the routing table. During real-time network operations, when the node receives data from the network or initiates data destined for a node in the network, the node determines a next hop for forwarding the data based on the destination of the data. If the destination is not the node itself, the node lookups the next hop in the routing table and forward the data to the next hop, which may be reached via a base link or a shortcut link. If the destination is the node itself, the data terminates at the node. Thus, the real-time routing is relatively simple. It should be noted that the routing table does not comprise history of the forwarding path, thus the routing table is stateless.

To enable the routing algorithm described above, each node may employ about four physical channels. For example, a first physical channel may be employed for transferring data in a clockwise direction in the shortcut ring. A second physical channel may be employed for transferring data in a counter-clockwise direction in the shortcut ring. A third physical channel may be employed for transferring data in a clockwise direction in the base ring. A fourth physical channel may be employed for transferring data in a counter-clockwise direction in the base ring. A deadlock may occur when incoming data arrives at a physical channel while the physical channel is busy operating on a previously received data. To avoid such a deadlock, each node may employ two VCs for each physical channel. For example, an incoming data may arrive at a physical channel while one VC is busy operating on a previously received data, but the other VC may accept the incoming data. To implement the VC scheme, each node may employ separate buffers for each VC. For example, to support two VCs, the node 600 may partition each queue 611-614 into two separate portions, each mapped to a VC and configured to operate independently.

In the routing algorithm described above, data transfer is limited to a single transfer direction in a clockwise direction or a counter-clockwise direction in the network. The limitation on the single transfer direction is based on the employment of about four physical channels. By limiting the data transfer to a single transfer direction, the probabilities of contentions and/or deadlocks may be reduced in the network. However, when VCs are employed, the transfer direction may be changed between a source-destination pair. For example, when two VCs are employed, the transfer direction may be changed once in a forwarding path between a source-destination pair.

To incorporate the employment of VCs, for example, a VC0 and a VC1, into the routing algorithm, a shortest path is selected for a source-destination pair, where the shortest path may comprise at most one transfer direction switch. For example, the first hop beginning at a source is assigned to VC0, subsequent hops in the same transfer direction as the first hop are also assigned to VC0, and a hop that switches the transfer direction is assigned to VC1. The routing algorithm allows a switch in transfer direction occurs to under two conditions. The first occurs when a second hop traverses a link between a node with address 0 and a node with address N−1 (e.g., from node 0 to node N−1 or from node N−1 to node 0), where N is the total number of nodes in the network. The second condition occurs when a hop subsequent to the second hop switches the transfer direction. It should be noted that although the VC scheme is described with the employment of two VCs, the VC scheme may be applied to multiple VCs. In general, the maximum number of transfer direction switches may be configured to be about one less than the total number of VCs.

Figure 8:
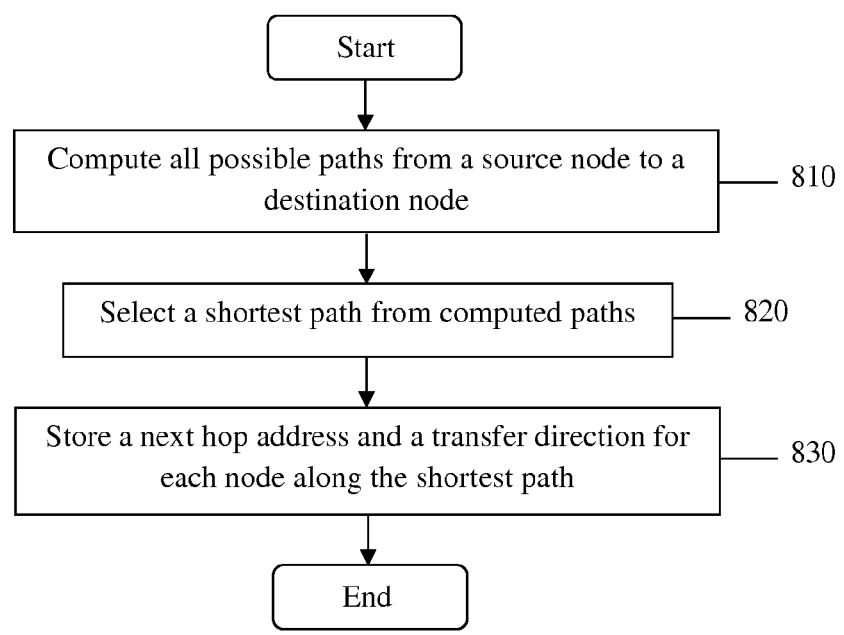
FIG. 8 is a flowchart of an embodiment of a method for generating a routing table.

FIG. 8 is a flowchart of an embodiment of a method 800 for generating a routing table. The method 800 may be implemented offline, for example, on a computer or a workstation, and the routing table may be pre-configured in a node, such as the node 410 and/or 510, in a hierarchical ring network, such as the network 400 and/or 500, for static routing. At step 810, all possible data forwarding paths are computed from a source node to a destination node in the network. For example, each path traverses the nodes along the path in a single transfer direction, which may be clockwise or counter-clockwise. At step 820, a shortest path is selected from the computed data forwarding paths, where the shortest path is the path that comprises a least number of intermediary nodes. At step 830, a next hop address and a transfer direction for each node along the shortest path is stored in a shortest path routing table entry. The method 800 is repeated for each node in the network. For example, N−1 entries are generated for each node in a network that comprises N nodes, where N is a positive integer.

Figure 9:
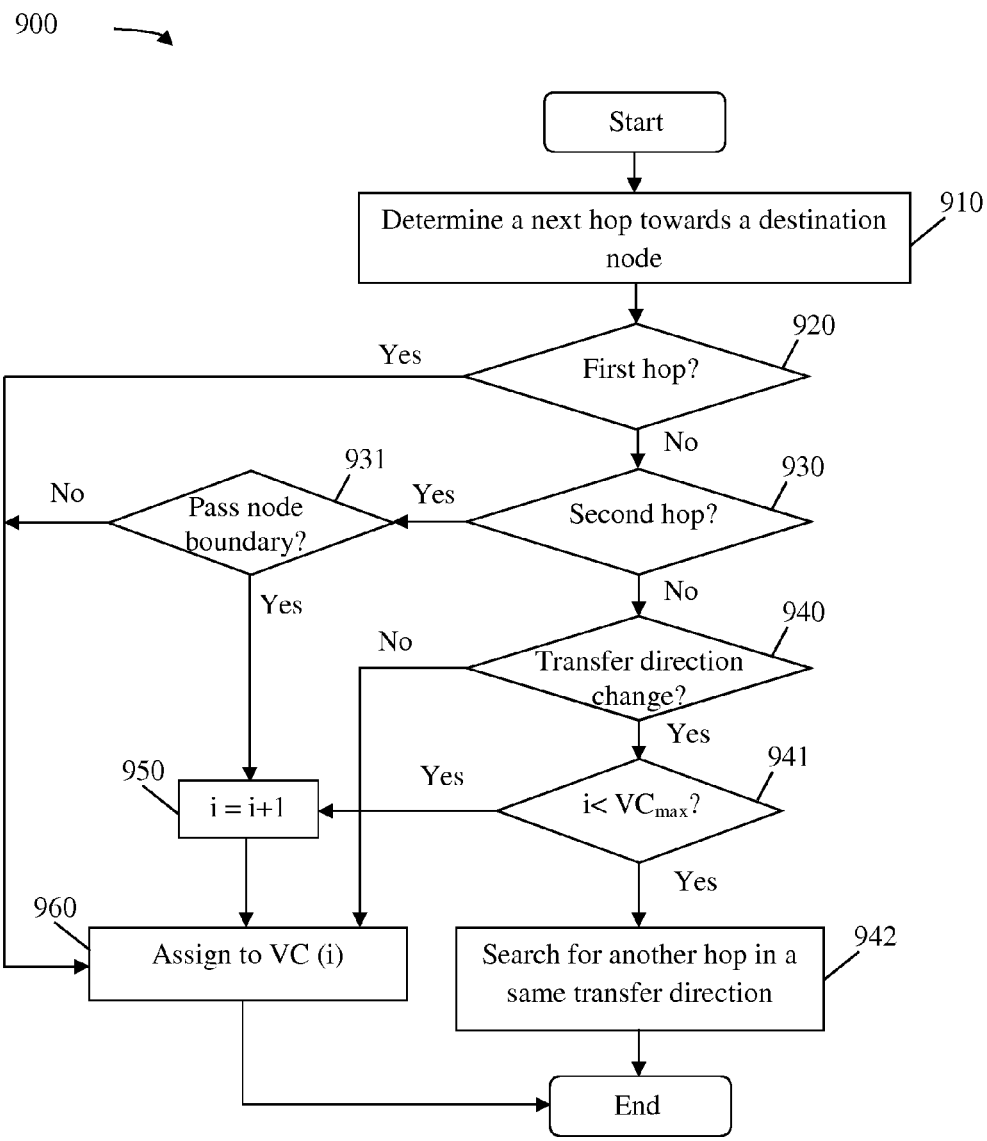
FIG. 9 is a flowchart of an embodiment of a method for assigning virtual channels (VCs).

FIG. 9 is a flowchart of an embodiment of a method 900 for assigning VCs. The method 900 may be implemented offline for example, on a computer or a workstation. The method 900 may be employed in conjunction with the method 800 to generate a routing table that allows a data forwarding path to change the transfer direction. Similarly, the routing table is employed by a node, such as the node 410 and/or 510, in a hierarchical ring network, such as the network 400 and/or 500, for static routing. The method 900 is applied when determining a next hop between a source node and a destination node, for example, during step 810 in the method 800. At step 910, a next hop towards the destination node is determined. At step 920, a determination is made whether the next hop is a first hop from the source node. If the next hop is a first hop from the source node, next at step 960, a VC number i, denoted as VC(i), is assigned to the first hop. For example, i may be initialized to a value of 0. If the next hop is not a first hop from the source node, next at step 930, a determination is made whether the next hop is a second hop from the source node.

If the next hop is a second hop, next at step 931, a determination is made whether the second hop passes a node boundary. For example, when the network comprises N nodes, the node boundary may be selected to be between node 0 and node N−1. A hop is considered to pass the node boundary when the hop crosses over the boundary in a clockwise direction (e.g., from node m to node n, where m>n) or in a counter-clockwise direction (e.g., from node m to node n, where m<n). If the second hop passes the node boundary, next at step 950, the VC channel number, i, is incremented by one, and at step 960, VC(i) is assigned to the second hop. Otherwise, next at step 960, VC(i) is assigned to the second hop.

If the next hop is not a second hop, next at step 940, a determination is made whether the next hop changes the transfer direction when compared to a previous hop, for example, from a clockwise direction to a counter-clockwise direction or from a counter-clockwise direction to a clockwise direction. If the transfer direction is not changed, next at step 960, VC(i) is assigned to the next hop. If the transfer direction is changed, next at step 941, a determination is made whether the VC number has reached a maximum number of VCs, denoted at $VC_{max}$. If the VC number is less than $VC_{max}$, next at step 950, the VC channel number, i, is incremented by one, and at step 960, VC(i) is assigned to the next hop. If the VC number has reached $VC_{max}$, next at step 942, a search is made to determine another hop in the same transfer direction.

Figure 10:
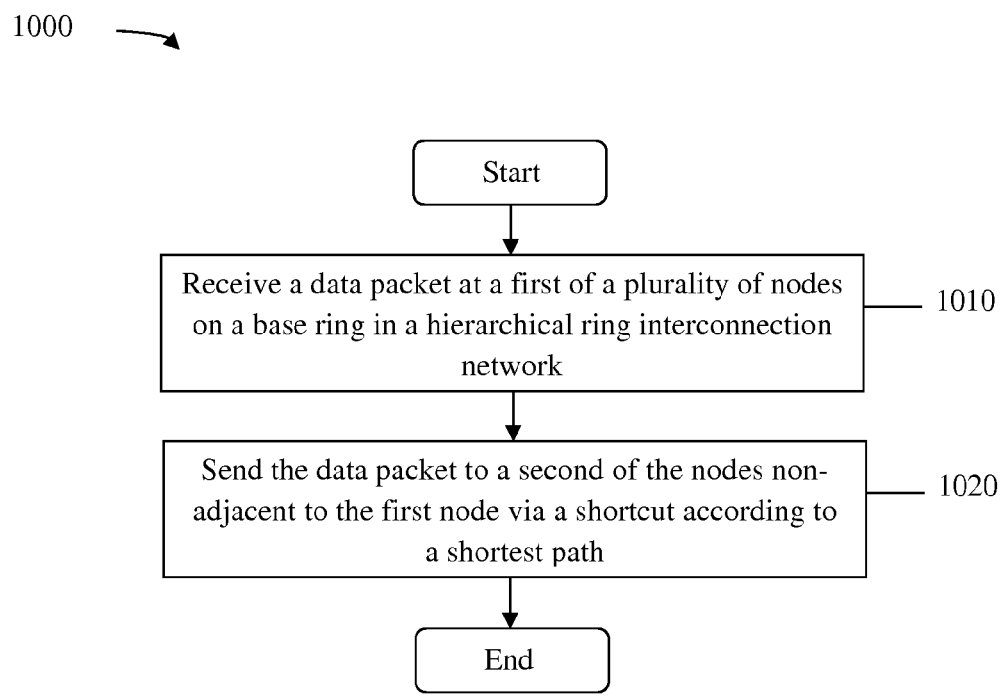
FIG. 10 is a flowchart of an embodiment of a method for transferring data in a hierarchical ring interconnect network.

FIG. 10 is a flowchart of an embodiment of a method 1000 for transferring data in a hierarchical ring interconnect network, such as the network 400 and/or 500. The method 1000 may be implemented at a node, such as the node 410, 510, 600, and/or 700. At step 1010, a data packet is received at a first of a plurality of nodes on a base ring in the network. For example, the network comprises a plurality of nodes, such as the nodes 410 and 510, arranged in a ring topology and interconnected by a plurality of base links, such as the base links 420 and 520, to form the base ring. At step 1020, the data packet is sent to a second of the nodes that is non-adjacent to the first node via a shortcut, such as the shortcuts 450, 460, 471-474, 550, 560, and 570. The shortcut is a physical connection that directly connects the first node to the second node and the placement of the shortcut may be determined by employing substantially similar mechanisms as described above in the network 400 or 500. The shortcut connection provides a shortest path in the network for the data packet to a destination node of the data packet. For example, the shortest path may be determined offline by employing similar mechanisms as described in the methods 700 and/or 800 and the shortcut that leads to the second node may be stored in a routing table.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An interconnection network comprising:
   a plurality of nodes arranged in a hierarchical ring topology, wherein the nodes comprise a first node and a second node, and wherein the first node is not adjacent to the second node;
   a base ring comprising a plurality of base links coupled to the plurality of nodes and configured to interconnect adjacent nodes to provide point-to-point communications between the adjacent nodes; and
   a first shortcut coupled to the first node and the second node, wherein the first shortcut is configured to provide a point-to-point communication between the first node and the second node, wherein the first node and the second node comprise gray code encoded addresses that are differed by 1-bit at a particular bit position, and wherein the gray code encoded addresses are node addresses of the first node and the second node encoded by a gray code algorithm that provides a 1-bit difference between successive integer values in a binary format.

2. The network of claim 1, wherein the nodes are arranged in an order of increasing node addresses, wherein N is a positive integer representing a total number of nodes in the network, wherein the first node and the second node are separated by $2^k-1$ nodes, and wherein k is a positive integer between 1 and $\text{Log}_2(N)-1$.

3. The network of claim 2, wherein each gray code encoded address comprises $\text{Log}_2(N)$ bits, and wherein the particular bit position corresponds to a $k^{th}$ least significant bit (LSB) of the gray code encoded addresses when $1 \leq k \leq \text{Log}_2(N)-2$.

4. The network of claim 2, wherein each gray code encoded address comprises $\text{Log}_2(N)$ bits, and wherein when k is equal to $\text{Log}_2(N)-2$, the particular bit position corresponds to a $(\text{Log}_2(N)-1)^{th}$ least significant bit (LSB), and the gray code encoded addresses comprise a same value at a $\text{Log}_2(N)^{th}$ LSB.

5. The network of claim 2, wherein each gray code encoded address comprises $\text{Log}_2(N)$ bits, and wherein when k is equal to $\text{Log}_2(N)-2$, the particular bit position corresponds to a $\text{Log}_2(N)^{th}$ least significant bit (LSB), and the gray code encoded addresses comprise a same value at a $(\text{Log}_2(N)-1)^{th}$ LSB.

6. The network of claim 2, wherein each gray code encoded address comprises $\text{Log}_2(N)$ bits, wherein the particular bit position corresponds to a $\text{Log}_2(N)-1)^{th}$ least significant bit (LSB) when k is equal to $\text{Log}_2(N)-1$, and wherein the first shortcut is associated with a level $\text{Log}_1(N)-1$ shortcut ring.

7. The network of claim 6, further comprising a second shortcut coupled to a third of the nodes and a fourth of the nodes separated by $$\frac{N}{2}-1$$

nodes, wherein the third node and the fourth node comprises gray code encoded addresses that differ by 1-bit at a $\text{Log}_2(N)^{th}$ LSB, and wherein the second shortcut is associated with another level $\text{Log}_2(N)-1$ shortcut ring.

8. The network of claim 1, wherein each node comprises a common number of interconnect ports configured to send and receive data in the network.

9. The network of claim 1, wherein the network is configured to transfer data from a third of the nodes to a fourth of the nodes based on a shortest path, wherein the transfer of the data is initiated at the third node and the data is destined for the fourth node, and wherein the shortest path comprises one of the base links, the first shortcut, or combinations thereof.

10. The network of claim 1, wherein the network transfers data from a third of the nodes to a fourth of the nodes via one or more intermediary nodes in a single transfer direction comprising a clockwise direction or a counter-clockwise direction, and wherein a transfer of the data is initiated at the third node and the data is destined for the fourth node.

11. The network of claim 1, wherein the network employs at least two virtual channels (VCs) for transferring data, wherein the data is transferred via a first of the VCs in a first hop beginning at a third of the nodes that initiated a transfer of the data, and wherein the data is transferred via a second of the VCs when a transfer direction is reversed.

12. The network of claim 1, wherein the network is a system on chip (SoC) interconnect.

13. A network node comprising:
   a first interconnect port configured to transfer data between the network node and a first node adjacent to the network node on a base ring in a hierarchical ring interconnection network;
   a second interconnect port configured to transfer data between the network node and a second node adjacent to the network node on the base ring;
   a third interconnect port configured to transfer data between the network node and a third node non-adjacent to the network node on the base ring, wherein the third node is a next node on a shortcut ring that comprises a gray code encoded address that switches a $k^{th}$ bit of the gray code encoded address of the network node, wherein k is a positive integer, wherein the third node's gray code encoded address is a node address of the third node encoded by a gray code algorithm that provides a 1-bit difference between successive integer values in a binary format, and wherein the network node's gray code encoded address is a node address of the network node encoded by the gray code algorithm;
   a memory coupled to the first interconnect port, the second interconnect port, and the third interconnect port, wherein the memory is configured to store a shortest path routing table; and
   a processing unit coupled to the first interconnect port, the second interconnect port, the third interconnect port, and the memory, wherein the processing unit is configured to direct data transfer between the first interconnect port, the second interconnect port, and the third interconnect port according to the shortest path routing table.

14. The network node of claim 13, wherein the shortest path routing table comprises a next node address in a shortest path for every destination node on the base ring and a transfer direction, and wherein the shortest path comprises a single transfer direction in a clockwise direction or a counter-clockwise direction.

15. The network node of claim 13, wherein the shortest path routing table comprises an address of a next node in a shortest path for every destination node on the base ring, and a virtual channel (VC), and wherein the VC comprises a dedicated transfer direction.

16. A method comprising:
receiving a data packet at a first of a plurality of nodes on a base ring in a hierarchical ring interconnection network, wherein the nodes are arranged in an order of increasing node addresses, and wherein each node is directly connected to two adjacent nodes via a base link; and
sending the data packet to a second of the nodes non-adjacent to the first node via a shortcut that directly connects the first node to the second node,
wherein the shortcut provides a shortest path in the network for the data packet to reach a destination node of the data packet,
wherein the second node is a nearest non-adjacent node in the base ring that comprises a gray code encoded address that switches a $k^{th}$ bit of a gray code encoded address of the first node,
wherein the first node's gray code encoded address is a node address of the first node encoded by a gray code algorithm that provides a 1-bit difference between successive integer values in a binary format,
wherein the second node's gray code encoded address is a node address of the second node encoded by the gray code algorithm, and
wherein k is a positive integer.

17. The method of claim 16, wherein N is a positive integer representing a total number of nodes in the network, and wherein the first node and the second node are separated by $2^k-1$ nodes when k comprises a value between 1 and $\text{Log}_2(N)-2$.

18. The method of claim 16, wherein N is a positive integer representing a total number of nodes in the network, and wherein the first node and the second node are separated by $$\frac{N}{4} - 1$$

nodes when the $k^{th}$ bit corresponds to a $(\text{Log}_2(N)-1)^{th}$ least significant bit (LSB) or a $\text{Log}_2(N)^{th}$ LSB.

19. The method of claim 16, wherein N is a positive integer representing a total number of nodes in the network, and wherein the first node and the second node are separated by $$\frac{N}{2} - 1$$

nodes when the $k^{th}$ bit corresponds to a $(\text{Log}_2(N)-1)^{th}$ least significant bit (LSB) or a $\text{Log}_2(N)^{th}$ LSB.

20. The method of claim 16, wherein N comprises a positive integer that is not a power of 2 and represents a total number of nodes in the network, wherein the first node and the second node are separated by $2^k-1$ nodes, wherein k comprises a value between 1 and $\text{Log}_2(M)-1$, and wherein M is a next-higher power of 2 for N.

* * * * *